(12) United States Patent
Abel et al.

(10) Patent No.: US 7,900,532 B2
(45) Date of Patent: Mar. 8, 2011

(54) ELECTRIC SHIFTING DEVICE FOR A MOTOR VEHICLE

(75) Inventors: Thomas Abel, Luedenscheid (DE); Ralf Boebel, Holzwickede (DE); Martin Deitmerg, Luedenscheid (DE); Thomas Luksch, Schalksmuehle (DE); Knut Moldenhauer, Hagen (DE); Frank Blaesing, Werl (DE); Dirk Bunselmeier, Meinerzhagen (DE); Klaus Hirschfeld, Luedenscheid (DE); Bjorn Mans, Dortmund (DE); Ralf Winkelmann, Heiden (DE); Michael Bleckmann, Schwerte-Ergste (DE); Rainer Buehlmann, Holzwickede (DE); Martin Kunze, Bochum (DE); Peter Molkow, Dortmund (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 138 days.

(21) Appl. No.: 12/500,707

(22) Filed: Jul. 10, 2009

(65) Prior Publication Data

US 2009/0320634 A1    Dec. 31, 2009

Related U.S. Application Data

(63) Continuation of application No. PCT/EP2008/051604, filed on Feb. 11, 2008.

(30) Foreign Application Priority Data

Feb. 13, 2007   (DE) .......................... 10 2007 007 667

(51) Int. Cl.
*B60K 20/00*         (2006.01)
(52) U.S. Cl. ..................... 74/473.18; 74/473.33; 74/900

(58) Field of Classification Search ................. 74/473.1, 74/473.12, 473.18, 473.21, 473.24, 473.25, 74/473.33, 900; 192/220, 220.1, 220.3, 220.4; 477/99, 125, 115
See application file for complete search history.

(56) References Cited

U.S. PATENT DOCUMENTS

| 2,917,941 | A | * | 12/1959 | Wittren | ...................... | 74/473.33 |
| 5,285,694 | A | * | 2/1994 | Chene | ......................... | 74/473.24 |
| 5,540,114 | A | * | 7/1996 | Kim | ............................. | 74/473.3 |

(Continued)

FOREIGN PATENT DOCUMENTS

DE    197 33 206    10/1998

(Continued)

OTHER PUBLICATIONS

International Preliminary Report for the corresponding PCT Application No. PCT/EP2008/051604 mailed Sep. 17, 2009.

*Primary Examiner* — Richard W Ridley
*Assistant Examiner* — Terence Boes
(74) *Attorney, Agent, or Firm* — Brooks Kushman P.C.

(57) ABSTRACT

An electric shifting device for a vehicle includes a shift lever, a gate channel, and a detent device. The detent device has a spring-loaded pin and a detent contour cooperating therewith. The detent contour includes first and second paths and a connection path therebetween. The detent contour is movable relative to the channel between a first position in which the first path is aligned with the channel and a second position in which the second path is aligned with the channel. The lever is connected to the pin such that the lever is movable within the channel along the first path when the detent contour is in the first position and within the channel along the second path when the detent contour is in the second position and such that the lever is movable along the connection path between the paths when the detent contour moves between the positions.

16 Claims, 2 Drawing Sheets

| U.S. PATENT DOCUMENTS | | | |
|---|---|---|---|
| 6,679,809 B2 | 1/2004 | Kato et al. | |
| 6,684,730 B2 | 2/2004 | Giefer et al. | |
| 2002/0166400 A1* | 11/2002 | Syamoto et al. | 74/473.21 |
| 2002/0178855 A1 | 12/2002 | Giefer et al. | |
| 2003/0032523 A1 | 2/2003 | Kato et al. | |
| 2007/0144294 A1* | 6/2007 | Sickart | 74/473.18 |

| FOREIGN PATENT DOCUMENTS | | |
|---|---|---|
| DE | 100 05 328 A1 | 8/2001 |
| DE | 20 2006 006 763 U1 | 7/2006 |
| EP | 1 262 689 A1 | 12/2002 |
| EP | 1 283 386 A2 | 2/2003 |
| FR | 2 796 116 | 1/2001 |

* cited by examiner

ELECTRIC SHIFTING DEVICE FOR A MOTOR VEHICLE

CROSS-REFERENCE TO RELATED APPLICATIONS

This application is a continuation of International Application PCT/EP2008/051604, published in German, with an international filing date of Feb. 11, 2008, which claims priority to DE 10 2007 007 667.5, filed Feb. 13, 2007; the disclosures of which are both hereby incorporated by reference.

BACKGROUND OF THE INVENTION

1. Field of the Invention

The present invention relates to an electric shifting device for a vehicle in which the shifting device includes a shift lever and a shift-limiting gate having a gate channel with the shift lever being mounted on a rotatable axis extending perpendicularly to the gate channel and being movable into different shift positions in the gate channel.

2. Background Art

An electric shifting device having a shift lever and a shift-limiting gate with at least one gate channel is used in vehicles equipped with an automated manual transmission. The shift-limiting gate serves to guide and limit the motion of the shift lever to the gate channel(s). The actual shifting process is carried out electro-hydraulically or by a motor while the desired gear selection of the vehicle user (e.g., the driver) is electronically detected. In such an automated manual transmission, the shift lever and possibly additional rocker switches for shifting up and down are available to the driver.

The shift lever can be multi-stable or mono-stable. A multi-stable shift lever can be set in any one of a plurality of stable positions. A mono-stable shift lever, like a joystick, has only one stable position into which the shift lever returns to from any one of a plurality of unstable positions.

In the case of the shift-limiting gate having two or more gate channels, the shift-limiting gate further includes one or more connecting channels. Typically, the shift-limiting gate is configured such that the gate channels are arranged parallel to one another with each pair of gate channels being connected to one another by a respective connecting channel extending perpendicularly to the gate channels. The shift lever is movable along a connecting channel extending between a pair of gate channels in order to move from one of the gate channels to the other gate channel.

DE 102 06 985 A1 (corresponding to U.S. Pat. No. 7,028,575) describes a shifting device having a mono-stable shift lever. The shift lever can pivot about two axes perpendicular to one another and can thereby be moved in two gate channels parallel to one another. The shift lever returns to the same respective stable position when the actuation force is released.

SUMMARY OF THE INVENTION

An object of the present invention includes an electric shifting device having a shift lever, a shift-limiting gate having a gate channel, and a detent contour having first and second detent paths in which the detent contour is movable relative to the shift-limiting gate between a first position in which the first detent path is aligned with the gate channel and a second position in which the second detent path is aligned with the gate channel.

In carrying out the above object and other objects, the present invention provides an electric shifting device for a vehicle. The shifting device includes a shift lever, a shift-limiting gate, and a detent device. The shift-limiting gate has a gate channel extending along a first axis. The shift lever extends through the gate channel such that a lower end of the shift lever is beneath the shift-limiting gate. The shift lever is movable along the first axis such that the shift lever can move within the gate channel. The detent device is beneath the shift-limiting gate. The detent device has a spring-loaded detent pin and a detent contour cooperating with the detent pin. The detent contour includes first and second detent paths extending parallel to the first axis and includes a connection path extending along a second axis perpendicular to the first axis between the first and second detent paths. The detent contour is movable relative to the shift-limiting gate in a direction parallel to the second axis between a first position in which the first detent path is aligned with the gate channel and a second position in which the second detent path is aligned with the gate channel. The lower end of the shift lever is connected to the detent pin such that the shift lever is movable within the gate channel along the first detent path when the detent contour is in the first position and is movable within the gate channel along the second detent path when the detent contour is in the second position and such that the shift lever is movable along the connection path between the first and second detent paths when the detent contour moves relative to the shift-limiting gate between the first and second positions.

In accordance with embodiments of the present invention, an electric shifting device for a vehicle includes a shift lever 1 and a shift-limiting gate having at least one gate channel. The shift lever is rotatably mounted about an axis perpendicular to the gate channel and is engageable in different shift positions in the gate channel. The lower end of the shift lever is connected to a detent device having a spring-biased detent pin and a detent contour cooperating therewith and having parallel first and second curved detent paths. The first detent path defines locking and/or non-locking positions (D, N, R, P) of the shift lever. The detent contour is displaceable as a whole at a right angle to the gate channel. In the second detent path, the shift lever is forcibly returned to an initial position P when the engine is switched off or when the ignition key is removed.

In accordance with embodiments of the present invention, an electric shifting device includes a shift lever, a shift-limiting gate having a gate channel, and a detent device. The lower end of the shift lever is connected to the detent device. The detent device includes a spring-loaded detent pin and a detent contour. The detent pin cooperates with the detent contour. The detent contour has first and second curved detent paths extending parallel to one another and extending parallel to the gate channel. The first detent path defines locking and/or non-locking shift positions of the shift lever. The entire detent contour can be displaced perpendicularly relative to the gate channel between first and second positions. The second detent path is preferentially provided so that the second detent position has the characteristic of either restoring the shift lever to a stable position or blocking the shift lever in specific shift positions.

The shifting device has extended shifting capabilities when the shift-limiting gate has a second gate channel oriented parallel to the first gate channel together with a connecting channel aligned perpendicular to the path of the gate channels and the detent contour has a third detent path that extends parallel with the first and second detent paths through which locking or non-locking shift positions are defined for the shift lever. In this design, the shift lever can be mounted to be displaced in the direction of the connecting channel such that the mounting of the shift lever is separated into a linear mounting (to move across the connecting channel) and a rotational mounting (to move along the gate channels). The linear mounting preferentially occurs through two column axes that are mounted together rotationally about another axis.

Additional advantageous embodiments and improvements of the shifting device according to the invention are explained with the aid of the preferred embodiment shown in the drawings.

DETAILED DESCRIPTION OF THE PREFERRED EMBODIMENT(S)

Figure 1:
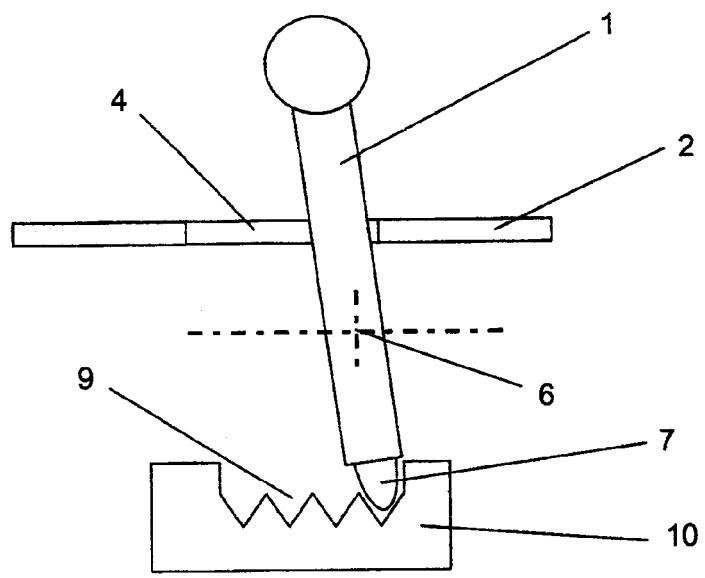
FIG. 1 illustrates an electric shifting device having a shift lever, a shift-limiting gate, and a detent device in accordance with an embodiment of the present invention.
Figure 2:
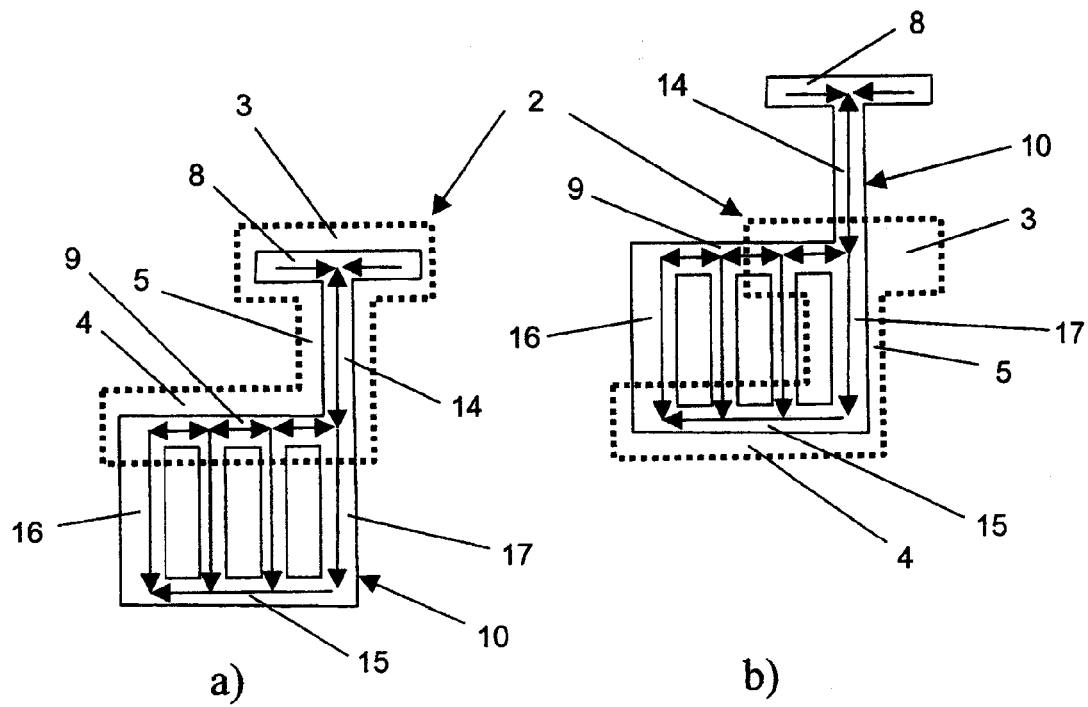
FIG. 2a illustrates a schematic representation of the detent contour with the overlying shift-limiting gate of the shifting device with the detent contour being in a first position relative to the shift-limiting gate.
FIG. 2b illustrates a schematic representation of the detent contour with the overlying shift-limiting gate of the shifting device with the detent contour being in a second position relative to the shift-limiting gate.

Referring now to FIGS. 1, 2a, and 2b, an electric shifting device in accordance with an embodiment of the present invention is shown. The shifting device includes a shift lever 1, a shift-limiting gate 2, and a detent device.

Shift-limiting gate 2 includes a first gate channel 3, a second gate channel 4, and a connecting channel 5. Gate channels 3, 4 run parallel to one another with second gate channel 4 being longer than first gate channel 3. Connecting channel 5 runs perpendicular to gate channels 3, 4 and extends between gate channels 3, 4. Shift-limiting gate 2 guides and limits the motion of shift lever 1 to gate channels 3, 4 and connecting channel 5. Shift lever 1 is shown in FIG. 1 within second gate channel 4. Shift lever 1 may be displaced along connecting channel 5 in order to move between gate channels 3, 4.

Figure 3:
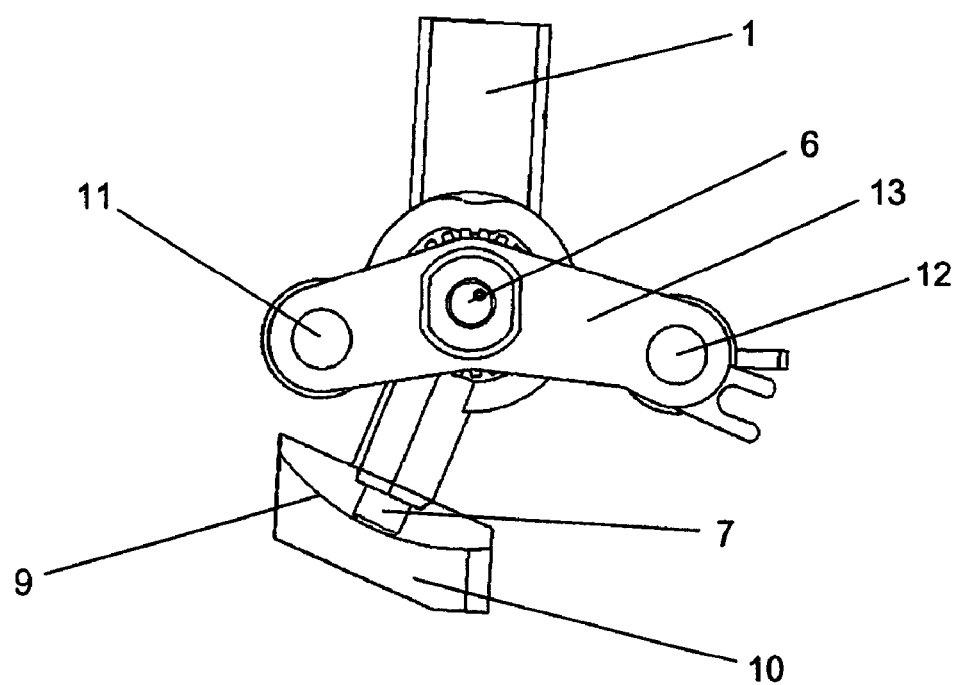
FIG. 3 illustrates the mounting of the shift lever.

In order for shift lever 1 to be displaced in shift-limiting gate 2 (i.e., to be displaced along first channel 3, second channel 4, and connecting channel 5), shift lever 1 can be displaced parallel in the direction of connecting channel 5 and is rotationally mounted by an axis 6 extending parallel to connecting channel 5. As is shown in FIG. 3, the mounting of shift lever 1 includes a linear mounting on two column axes 11, 12 parallel to connecting channel 5 on which shift lever 1 is movably mounted. Column axes 11, 12 are connected to one another at their two ends by a connecting plate 13. Connecting plate 13 is in turn mounted in its middle region on another axis 6 aligned parallel to column axes 11, 12 and is rotatable about axis 6. Shift lever 1 is thereby mounted displaceably along connecting channel 5 and is pivotable along gate channels 3, 4.

Shift lever 1 is connected by an electronic shift position detection device (not shown) through which the respectively engaged shift position is electronically detected. The engaged shift position is indicative of the respective gear selection made by the driver. In this case, for example, electro-mechanical or contactless shift position detection devices such as those operating on the basis of magnetic field or optical sensors can be used. The actual shifting process corresponding to the desired gear selection is then carried out electro-hydraulically or by an electric motor in an automated manual transmission.

The detent device is connected to the lower end of shift lever 1 in order to implement locking and non-locking shift positions. The detent device includes a spring-loaded detent pin 7 and a detent contour 10. Detent contour 10 cooperates with detent pin 7 as is shown schematically in FIGS. 1, 2a, and 2b.

As is shown schematically in FIGS. 2a and 2b, detent contour 10 has a first detent path 8, a second detent path 9, and a third detent path 15. Detent paths 8, 9, 15 lie parallel to one another. Detent contour 10 further includes a connection path 14 and two additional connection paths 16, 17. Connection paths 14, 16, 17 lie parallel to one another and perpendicular to detent paths 8, 9, 15. Connection path 14 connects detent first and second detent paths 8, 9 to one another. Additional connection paths 16, 17 connect the front and rear ends of second detent path 9 and third detent path 15 together.

Detent contour 10 is movable in its entirety between first and second positions relative to shift-limiting gate 2. In particular, detent contour 10 is movable in its entirety in either direction parallel to connecting channel 5 connecting gate channels 3, 4 in order to move between the first and second positions relative to shift-limiting gate 2. To this end, detent contour 10 is connected to an actuator (not shown) which is operable for moving detent contour 10 between the first and second positions relative to shift-limiting gate 2. The actuator can, for example, include an electric motor or solenoid.

FIG. 2a illustrates detent contour 10 in the first position relative to shift-limiting gate 2. FIG. 2b illustrates detent contour 10 in the second position relative to shift-limiting gate 2. The solid lines in FIGS. 2a and 2b represent detent contour 10 and the dotted lines in FIGS. 2a and 2b represent shift-limiting gate 2 lying above detent contour 10. The arrows in FIGS. 2a and 2b within detent paths 8, 9, 15 indicate the direction of the restoring force that acts on shift lever 1 at each respective position. As described in greater detail below, the first position of detent contour 10 shown in FIG. 2a is the stable position of the shifting device and the second position of detent contour 10 shown in FIG. 2b is the displaced position of the shifting device.

As shown in FIG. 2a, in the stable position of the shifting device, detent contour 10 is oriented with respect to shift-limiting gate 2 such that detent paths 8, 9 lie below gate channels 3, 4. As a result, shift lever 1 is movable within gate channels 3, 4 and can there engage the locking or non-locking shift positions defined by detent paths 8, 9. In first gate channel 3, shift lever 1 can be moved non-lockably only fore and aft, and returns to the middle position between these directions. For a gear selector lever this is the equivalent of a manual upshift or downshift. Along connection channel 5, shift lever 1 is lockably adjustable in the rear end position of second gate channel 4 (i.e., the underlying detent path 9). For a gear selector lever this corresponds to the normal drive position "D". Along this detent path 9, shift lever 1 can then be moved into three additional shift positions, namely the settings for neutral, reverse, and park, in which shift lever 1 is respectively locked. In its forward position inside second gate channel 4, shift lever 1 is located in the park position in which the vehicle is shut down. Changing of the shift position in gate channel 4 thus requires a fore or aft activation of shift lever 1.

In order to return shift lever 1 from an arbitrary setting to this stable position or park position, detent contour 10 is displaced with respect to shift-limiting gate 2 to move from the first position to the second position shown in FIG. 2b. The displacement of detent contour 10 with respect to shift-limiting gate 2 takes place transversely in the example shown here, in particular, perpendicular to the path of gate channels 3, 4, and specifically so that they assume a position with respect to one another as shown in FIG. 2b. Due to the return forces acting on shift lever 1, shift lever 1 is displaced from an arbitrary position to the forward position inside second gate channel 4 such that shift lever 1 ends in the park position. This displacement can, for example, be produced automatically when the vehicle engine is shut off or the ignition key is removed.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An electric shifting device for a vehicle, the shifting device comprising:
    a shift lever;
    a shift-limiting gate having a gate channel extending along a first axis;
    wherein the shift lever extends through the gate channel such that a lower end of the shift lever is beneath the shift-limiting gate, wherein the shift lever is movable along the first axis such that the shift lever can move within the gate channel;
    a detent device beneath the shift-limiting gate, the detent device having a spring-loaded detent pin and a detent contour cooperating with the detent pin, wherein the detent contour includes first and second detent paths extending parallel to the first axis and includes a connection path extending along a second axis perpendicular to the first axis between the first and second detent paths;
    wherein the detent contour is movable relative to the shift-limiting gate in a direction parallel to the second axis between a first position in which the first detent path is aligned with the gate channel and a second position in which the second detent path is aligned with the gate channel;
    wherein the lower end of the shift lever is connected to the detent pin such that the shift lever is movable within the gate channel along the first detent path when the detent contour is in the first position and is movable within the gate channel along the second detent path when the detent contour is in the second position and such that the shift lever is movable along the connection path between the first and second detent paths when the detent contour moves relative to the shift-limiting gate between the first and second positions.

2. The shifting device of claim 1 wherein:
    the first detent path defines at least one locking shift position of the shift lever.

3. The shifting device of claim 1 wherein:
    the first detent path defines at least one non-locking shift position of the shift lever.

4. The shifting device of claim 1 wherein:
    the second detent path is configured to forcibly convey the shift lever into a stable position.

5. The shifting device of claim 1 wherein:
    the second detent path is configured to block the shift lever in a shifting position.

6. The shifting device of claim 1 wherein the gate channel of the shift-limiting gate is a first gate channel and the connection path of the detent contour is a first connection path, wherein:
    the shift-limiting gate further includes a second gate channel extending parallel to the first axis and a connection channel extending parallel to the second axis between the first and second gate channels;
    wherein the detent contour further includes a third detent path extending parallel to the first axis and a second connection path extending between the second and third detent paths along the second axis perpendicular to the first axis;
    wherein in the first position of the detent contour the first detent path is aligned with the first gate channel, the second detent path is aligned with the second gate channel, and the first connection path is aligned with the first connection channel;
    wherein in the second position of the detent contour the second detent path is aligned with the first gate channel, the third detent path is aligned with the second gate channel, and the second connection path is aligned with the second connection channel.

7. The shifting device of claim 6 wherein:
    when the detent contour is in the first position, the shift lever is movable within the first gate channel along the first detent path, within the first connection channel along the first connection path, and within the second gate channel along the second detent path.

8. The shifting device of claim 7 wherein:
    the shift lever moves along the first connecting path between the first and second detent paths when the detent contour moves relative to the shift-limiting gate between the first and second positions.

9. The shifting device of claim 6 wherein:
    when the detent contour is in the second position, the shift lever is movable within the first gate channel along the second detent path, within the second connection channel along the second connection path, and within the second gate channel along the third detent path.

10. The shifting device of claim 9 wherein:
    the shift lever moves along the second connecting path between the second and third detent paths when the detent contour moves relative to the shift-limiting gate between the first and second positions.

11. The shifting device of claim 6 wherein:
    the third detent path defines at least one locking shift position of the shift lever.

12. The shifting device of claim 6 wherein:
    the third detent path defines at least one non-locking shift position of the shift lever.

13. The shifting device of claim 6 wherein:
    the shift lever is mounted to be displaceable in the direction of the connection channel.

14. The shifting device of claim 1 wherein:
    the mounting of the shift lever is subdivided into a linear bearing and a rotational bearing.

15. The shifting device of claim 14 wherein:
    the linear bearing is achieved by two column axes mounted rotationally about an additional axis.

16. The shifting device of claim 1 wherein:
    the shift lever is a gear selector switch.

* * * * *